United States Patent
Fischer et al.

(10) Patent No.: US 7,028,751 B2
(45) Date of Patent: Apr. 18, 2006

(54) BOX-LIKE COOLING SYSTEM

(75) Inventors: Daniela Fischer, Zell (DE); Wolfgang Knecht, Stuttgart (DE); Werner Zobel, Boblingen (DE); Mark Reichler, Stuttgart (DE); Jörg Soldner, Ehningen (DE)

(73) Assignee: Modine Manufacturing Company, Racine, WI (US)

( * ) Notice: Subject to any disclaimer, the term of this patent is extended or adjusted under 35 U.S.C. 154(b) by 151 days.

(21) Appl. No.: 10/132,602

(22) Filed: Apr. 25, 2002

(65) Prior Publication Data

US 2002/0189786 A1 Dec. 19, 2002

(30) Foreign Application Priority Data

Apr. 25, 2001 (DE) ............................... 101 20 483

(51) Int. Cl.
 *B60H 3/00* (2006.01)
(52) U.S. Cl. ............................. 165/42; 165/51; 165/121
(58) Field of Classification Search .................. 165/41, 165/42, 43, 44, 51, 121
 See application file for complete search history.

(56) References Cited

U.S. PATENT DOCUMENTS

| | | | |
|---|---|---|---|
| 3,203,499 A * | 8/1965 | Bentz et al. ............... | 165/41 X |
| 6,164,909 A * | 12/2000 | Ehlers et al. ............. | 165/41 X |
| 6,354,096 B1 | 3/2002 | Siler et al. | |
| 6,363,892 B1 * | 4/2002 | Zobel et al. ............. | 123/41.12 |
| 6,401,801 B1 * | 6/2002 | Dicke ........................... | 165/41 |
| 6,427,766 B1 * | 8/2002 | Zobel et al. ............... | 165/41 X |
| 6,564,857 B1 * | 5/2003 | Zobel et al. ................... | 165/51 |
| 6,732,681 B1 * | 5/2004 | Hendricks, Sr. ............. | 165/41 |
| 6,749,007 B1 * | 6/2004 | Ehlers et al. ................. | 165/41 |
| 6,755,158 B1 | 6/2004 | Knecht et al. | |
| 2002/0152766 A1 * | 10/2002 | Fischer et al. ................ | 62/428 |

FOREIGN PATENT DOCUMENTS

| | | |
|---|---|---|
| DE | PS 489 324 | 7/1930 |
| DE | 295 04 867 U1 | 8/1996 |
| DE | 197 24 728 A1 | 2/1999 |
| DE | 198 46 518 A1 | 4/2000 |
| DE | 019950754 A1 * | 4/2001 |
| EP | 001045217 A1 * | 4/1999 |
| EP | 001182334 A2 * | 6/2001 |
| EP | 001182414 A2 * | 6/2001 |

* cited by examiner

*Primary Examiner*—Ljiljana Ciric
(74) *Attorney, Agent, or Firm*—Wood, Phillips, Katz, Clark & Mortimer

(57) ABSTRACT

A cooling system includes a radial fan rotatable by an axis to deliver radial air flow to the cooling system, a plurality of heat exchangers spaced radially from the fan and arranged around the fan in a box-like configuration to receive the radial air flow therefrom, with the heat exchangers bounding an interior space of the cooling system. One of the heat exchangers is provided in the form of a charge air cooler that includes a first flow path for a charge air flow in heat exchange relation with a second flow path for an engine coolant flow of the vehicle. The cooling system further includes a surface associated with the charge air cooler to substantially block the radial air flow from exiting the interior space through the charge air cooler.

6 Claims, 5 Drawing Sheets

BOX-LIKE COOLING SYSTEM

RELATED APPLICATIONS

This application claims priority to prior filed German application DE 101 20 483.3 filed Apr. 25, 2001, the entire disclosure which is incorporated herein by reference.

FIELD OF THE INVENTION

This invention relates to cooling systems, and more particularly to cooling systems wherein a box-like arrangement of heat exchangers surrounds a radial fan to receive a radial air flow therefrom.

BACKGROUND OF THE INVENTION

Box-like cooling systems are known for use in vehicles, particular in utility vehicles or trucks. In principle, such cooling systems are more efficient then conventional cooling systems that utilize an axial fan because the radial fans utilized in box-like cooling systems can provide a greater air flow volume then axial fans and have better running properties. Examples of box-like cooling systems are shown in EP 1 045 217 A1 and DE 197 24 728 A1.

In at least some box-like cooling systems, such as is shown in DE 197 24 728 A1, a charge air cooler forms the top of the box-like arrangement of heat exchangers that surround the radial fan. The provision of the charge air cooler on top requires that air guide channels be provided in order to draw off the cooling air flow after it exits the core of the charge air cooler. This requires additional space over the top of the box-like cooling system. This can create a problem in modern designs of utility vehicles and trucks because the cooling system may require space that could otherwise be provided for the interior of the vehicle to enhance the comfort of the operating personnel.

In addition to potentially smaller envelopes being available for utility vehicle cooling systems, there is a demand for greater cooling power in such systems. However, in conventional systems that utilize axial fans, the desired cooling power will typical require increasing the surface area of the cooling system through which the air is flowed beyond what may be available in the typical utility vehicle without altering the vehicle concept.

SUMMARY OF THE INVENTION

The principle object of the invention is to provide an improved cooling system for a vehicle.

This object is achieved in a cooling system that includes a radial fan rotatable about an axis to deliver a radial air flow to the cooling system, a plurality of heat exchangers spaced radially from the fan and arranged around the fan to receive the radial air flow therefrom, with the heat exchangers bounding on interior space of the cooling system. One of the heat exchangers is a charge air cooler which includes a first flow path for a charge air flow in heat exchange relation with a second flow path for an engine coolant flow of the vehicle. The system further includes a surface associated with the charge air cooler to block the radial air flow from exiting the interior space through the charge air cooler.

In one form, the charge air cooler includes a pair of charge air manifolds arranged on opposite sides of the charge air cooler to direct the charge air flow to and collect the charge air flow from the first flow path. The charge air manifolds include rearward facing ends, with at least one of a charge air inlet and a charge air outlet arranged thereon.

In one aspect, the charge air cooler further includes a plurality of rows of flattened tubes extending between the charge air manifolds to define the first flow path, and a plurality of plate pairs arranged between the rows of flattened tubes, with the plate pairs enclosing flow channels to define the second flow path for the engine coolant.

According to one form, each of the plate pairs includes pairs of flanged openings that are connected with the flanged openings of any adjacent plate pairs to define a coolant inlet manifold and a coolant outlet manifold for directing the coolant flow to the flow channels and collect the coolant from the flow channels, respectively. The inlet and outlet manifold extend substantially perpendicular to the flow channels.

In one form, the flattened tubes extend transverse to the axis of the fan and at least of the charge air manifolds extends adjacent to a manifold of another of the plurality of heat exchangers.

In one aspect, at least one of the plurality of heat exchangers is a radiator for the engine coolant and includes a coolant outlet connected to a coolant inlet for the charge air cooler to direct the engine coolant to the second flow path.

In one aspect, the surface is defined at least in part by a broad side of the charge air cooler.

In one aspect, the surface is defined at least in part by a wall located between the charge air cooler and the fan.

In one form, the cooling system further includes a rear wall that closes an opening to the interior space bounded by the plurality of heat exchangers, and an additional heat exchanger is arranged in the rear wall.

Other objects and advantages of the invention will become apparent from a review of the entire specification, including the appended claims and drawings.

DETAILED DESCRIPTION OF THE PREFERRED EMBODIMENTS

Figure 1:
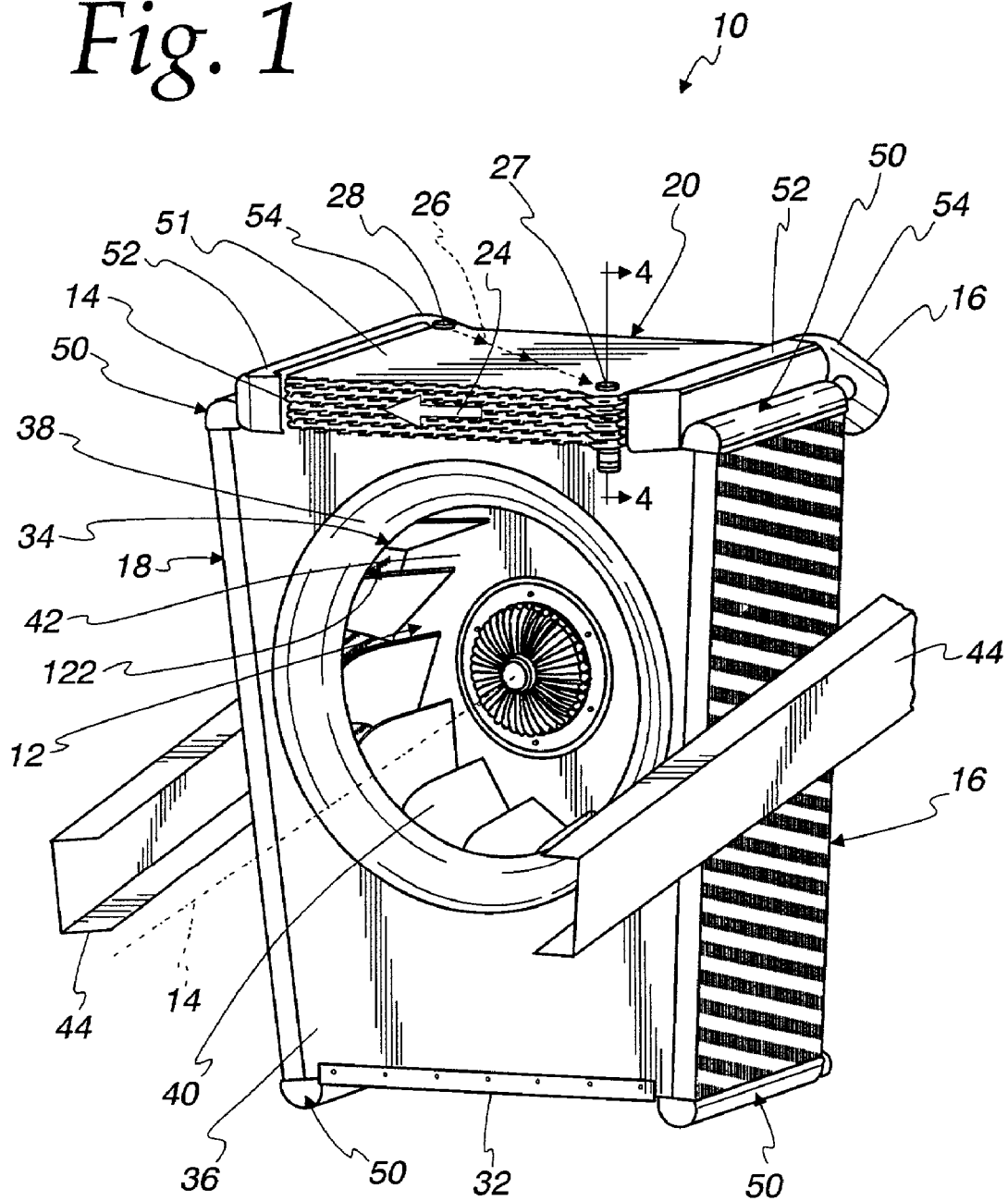
FIG. 1 is a perspective view of the front of a cooling system embodying the present invention.
Figure 2:
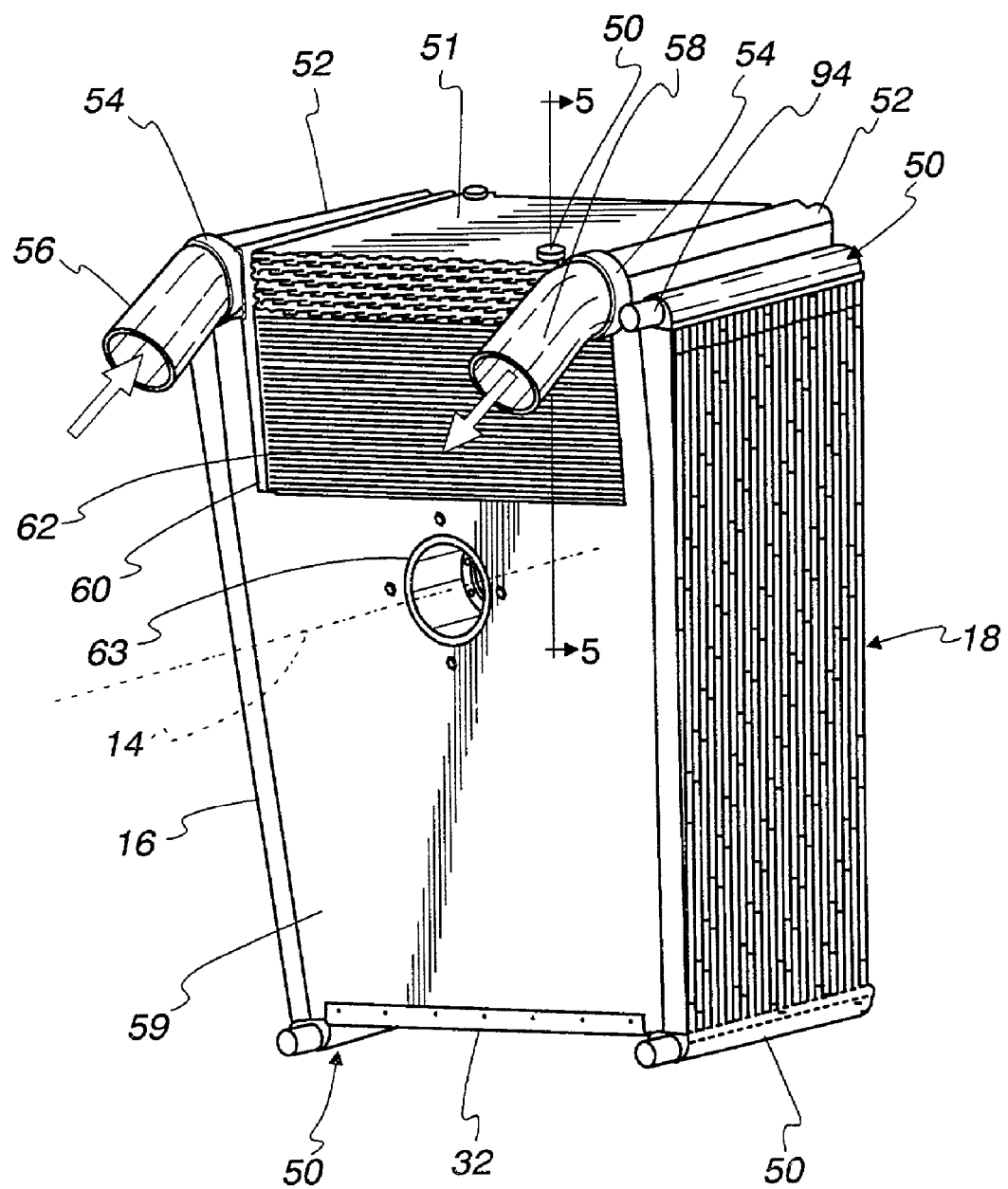
FIG. 2 is a perspective view of the rear of the cooling system shown in FIG. 1.
Figure 3:
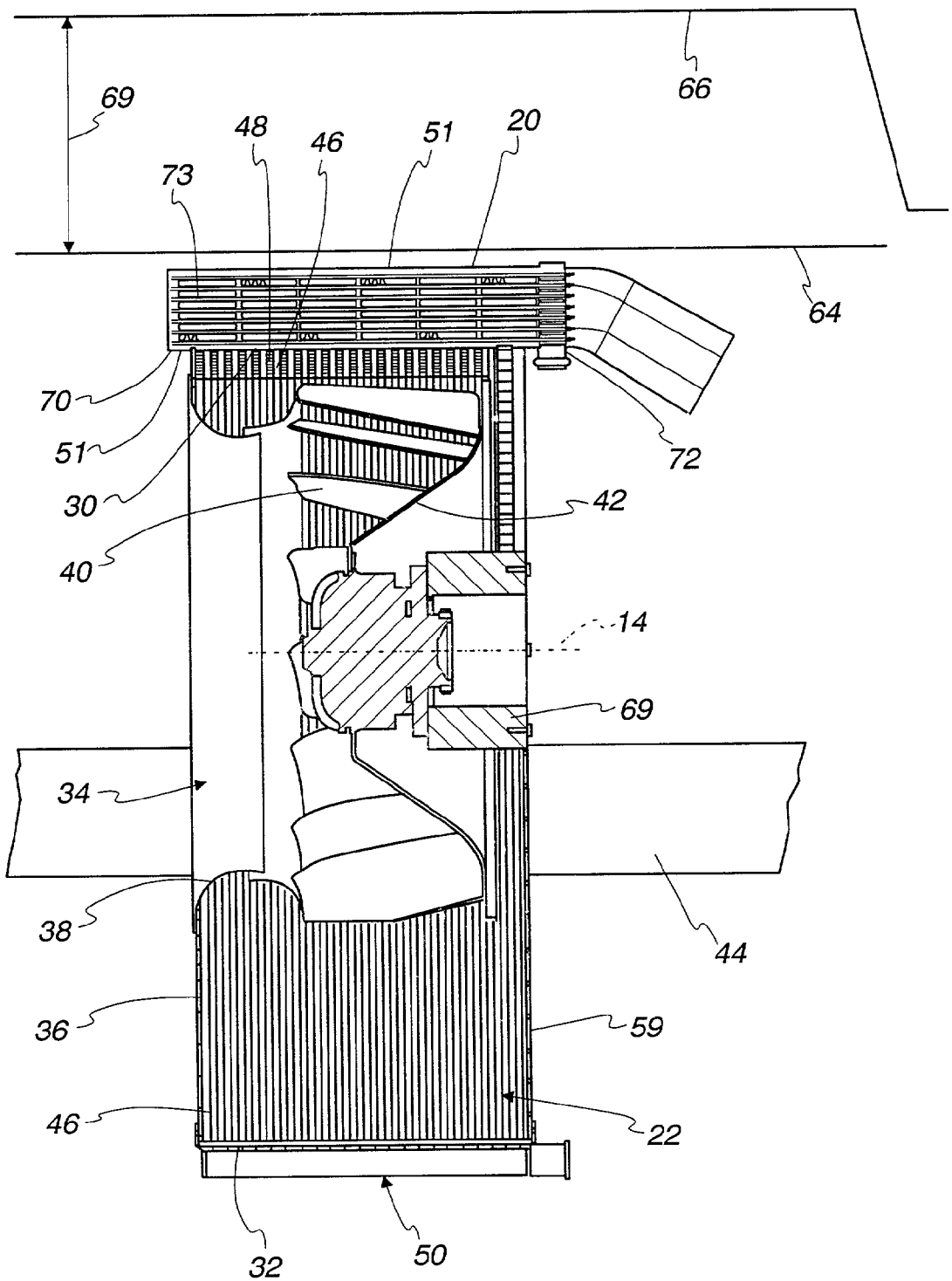
FIG. 3 is a vertical section through the cooling system shown in FIGS. 1 and 2.
Figure 6:
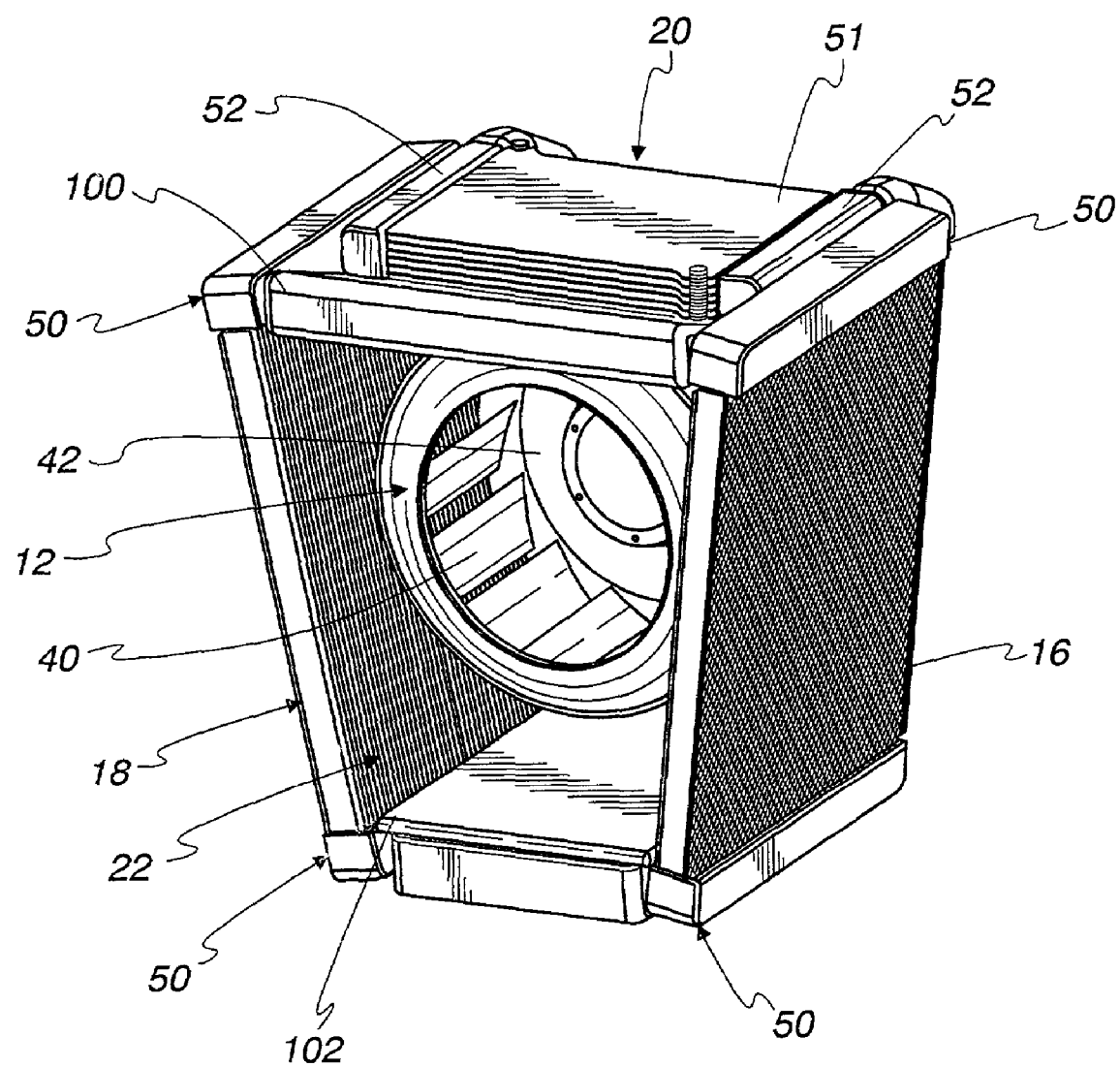
FIG. 6 is a perspective view of the front of another embodiment of the cooling system according to the invention.

With reference to FIGS. 1 and 2, a cooling system 10 embodying the present invention includes a radial fan 12 rotatable about an axis 14 to deliver a radial air flow to the cooling system 10, a plurality of heat exchangers 16, 18, and 20 spaced radially from the fan 12 and arranged around the fan 12 in a box-like configuration to receive the radial air flow therefrom, with the heat exchangers 16, 18, and 20 bounding an interior space 22 (as best seen in FIG. 6) of the cooling system 10. The heat exchanger 20 is provided in the form of a charge air cooler 20 that includes a first flow path, shown schematically at 24 in FIG. 1, for a charge air flow in heat exchange relation with a second flow path, shown schematically at 26, for an engine coolant flow of the vehicle. As best seen in FIG. 3, the cooling system 10 further includes a surface 30 associated with the charge air cooler 20 to substantially block the radial airflow from exiting the interior space 22 through the charge air cooler 20. Because the coolant system 10 does not include a heat exchanger on the bottom, a wall 32 is provided to form the bottom of the box-like arrangement and to block the radial air flow from exiting the bottom of the cooling system. An air intake opening 34 is provided in a front wall 36 and includes a nozzle 38 that directs an axial air flow into the radial fan 12. In the illustrated embodiment, the nozzle 38 is arranged offset upwardly in the wall 36. The fan 12 includes blow-off scopes or blades 40 and a rear wall 42. Also seen in FIG. 1 are a pair of longitudinal spars or frame members 44 which form part of the vehicle and are not part of the cooling system 10.

The heat exchangers 16, 18 are provided in the form of coolant coolers or radiators 16, 18 and, as best seen in FIG. 3, are of a known construction which includes a plurality of parallel, flat tubes 46, with serpentine fins 48 arranged between the tubes 46, and a pair of collecting boxes or tanks 50 between which the tubes 46 extend so that they run transverse to the axis 14.

The charge air cooler has a pair of broad sides 51, with one of the broad sides 51 facing upwardly and the other broad side 51 facing downward toward the interior space 22 of the cooling system 10. In the embodiment illustrated in FIG. 3, a portion of the downward facing broad side 51 defines the surface 30. The charge air cooler 20 includes a pair of collecting boxes or manifolds 52 arranged on opposite sides of the charge air cooler 20 to direct the charge air flow to and collect the charge air flow from the first flow path 24. The manifolds 52 each include rearward facing ends 54 with a charge air inlet 56 arranged on one the ends 54 and a charger outlet 58 arranged on the other end 54. As viewed from the rear in FIG. 2. The manifold 50 of the radiator 16 and the manifold 52 of the charge air cooler 20 form an upper left hand corner of the box-like arrangement, and the manifold 50 of the radiator 18 and the manifold 52 of the charge air cooler 20 form an upper right hand corner of the box-like arrangement.

As best seen in FIG. 2, a rear wall 59 includes an opening 60 with a heat exchanger in the form of a condenser 62 mounted therein for an air conditioner of the vehicle. However, it should be understood that any other type of heat exchanger or cooler could be located in the rear wall 59, and further that the rectangular shape of the opening 60 and of the condenser 62 are also optional. It can also be seen that the rear wall 59 mounts a bearing 63 of the radial fan 12, again slightly above center, which is driven by the utility vehicle in a manner not further shown, As seen in FIG. 3, a cabin floor 64 of the vehicle is shown in connection with a cabin floor 66 of a vehicle associated with a prior art type box-like cooling system. The spacing 68 between the floors 64 and 66 indicate the savings associated with the illustrated embodiment and that a flat cabin floor 64 can be achieved. These comparisons are for a known construction of an existing utility vehicle with comparable systems without changing the longitudinal frame members 44 or any other significant parts of the existing utility vehicle. It can also be seen in FIG. 3 that, in the illustrated embodiment, the charge air cooler 20 has a forward protrusion 70 and rearward protrusion 72 that extend forward and rearward, respectively, beyond the rest of the cooling system 10. This expedient is advantages when adapting the cooling capacity of the charge air cooler 20 to the requirements of a particular application. Further, the protrusions 70 and 72, either alone or together, also permit a flatter design for the charge air cooler 20, so that the total design height of the arrangement can be reduced.

Figure 4:
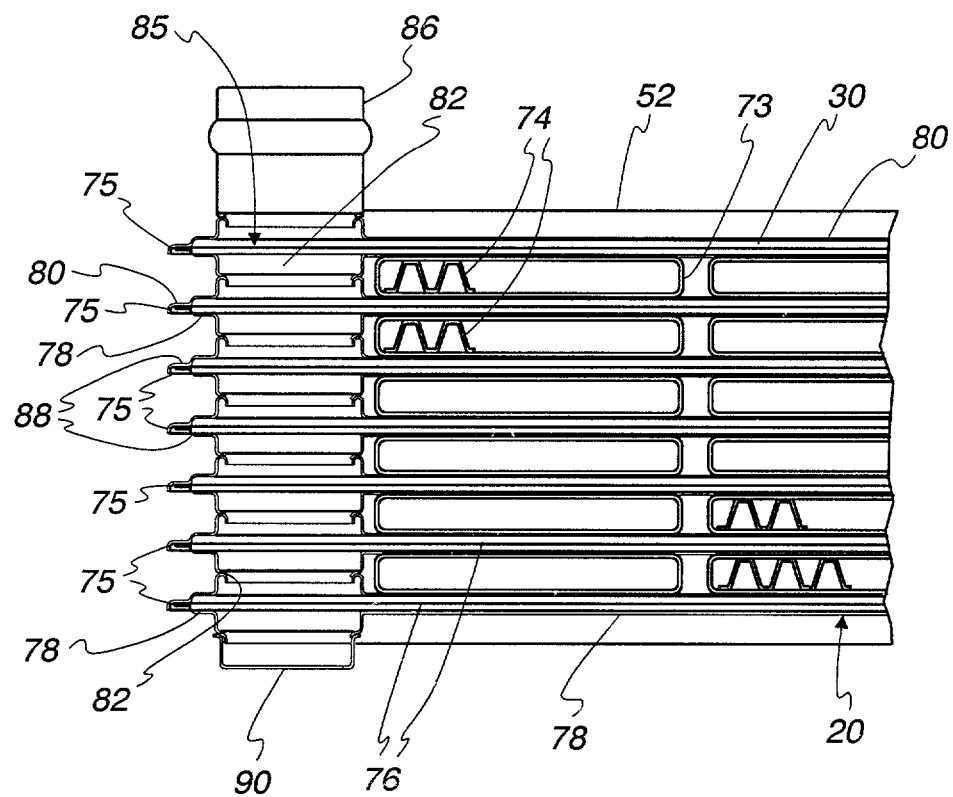
FIG. 4 is an enlarged rotated section view taken along line 4—4 in FIG. 1 and rotated 180°.
Figure 5:
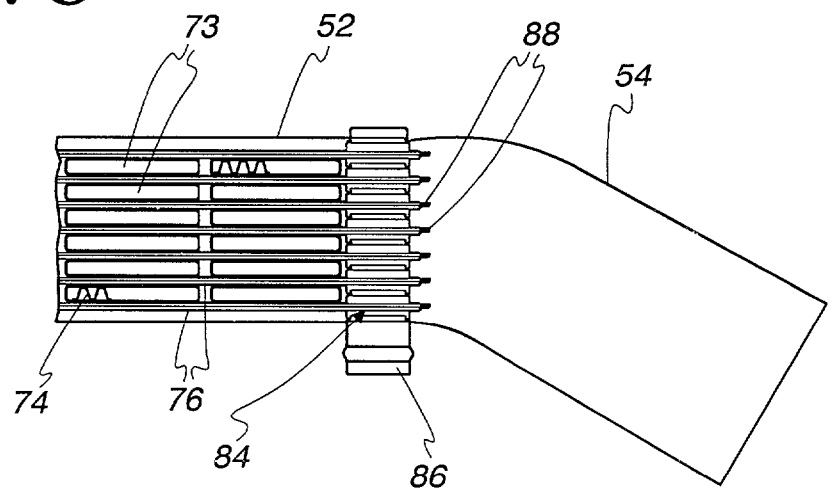
FIG. 5 is an enlarged section view taken along line 5—5 in FIG. 1.

Having described the overall construction of the cooling system 10, one preferred embodiment of the charge air cooler 20 will now be described with primary reference to FIGS. 4 and 5. The charge air cooler 20 includes a plurality of rows of flattened tubes 73 that extends between the manifolds 52, with ends of the tubes 73 received in openings (not shown) in the manifold 52. The interiors of the tubes 73 define the first flow path 24 so that the charge air can enter the inlet 56, flow through the manifold 52 to the tubes 73, and then to the manifold 52 to finally exit through the outlet 58. Turbulators 74 or the like are provided inside the flat tube 73 in order to improve the efficiency of the heat exchange between the charge air and the coolant. On the coolant side, a plurality of plate pairs 75 are arranged between the rows of the flattened tubes 73. The plate pairs 75 enclose flow channels 76 that define the second flow path 26 through the charge air cooler 20. Each of the plate pair 75 includes a pair of deformed plates 78 and 80 that are mated together and are roughly rectangular in shape and are somewhat smaller in size than the two broad sides 51 of the charge air cooler 20. The plates 78 and 80 each includes two flanged openings 82 (only one shown for each plate 78, 80 in FIG. 4) that are connected with the flange openings 82 of any adjacent plate pair 75 to define a coolant inlet manifold 84 at one corner of the plate pairs 75 and a coolant outlet manifold 85 at a opposite corner of the plate pairs 75 directing the coolant to the flow channels 76 and collecting the coolant from the flow channel 76, respectively. It can be seen that this construction results in the inlet and outlet manifolds 84 and 85 extending substantially perpendicular to the flow channel 76. An appropriate connecter 86 is provided on each of the inlet and outlet manifolds 84 and 85 to allow for connection of the corresponding coolant lines of the vehicle. Suitable bends and flanges are provided on the peripheral edges 88 of the plates 78 and 80 and the flanges of the openings 82 in order to permit braze or solder connections of the plates 80 and 82. At an end opposite the connector 86, a cap 90 is provided to close the ends of each of the manifolds 84 and 85. In some applications it may make sense to make the top most plate 78 and the bottom most plate 80 somewhat thicker. However, this is not shown in the drawings. It may also be advantages for at least some of the plates 78 and 80 to be provided with knobs or similar embossings that permit brazed or soldered connections between the plates 78 and 80 so as to increase the strength of the flow channels 76. Again, these features are not shown. The broad side 51 of the charge air cooler 30 may correspond roughly to the dimensions of the plates 78 and 80, or as shown in FIGS. 2 and 3, include parts of the side of both or at least part of one of the manifolds 52 that face the interior 22 of the system 10, depending upon the requirements of each particular application. Preferably, all of the individual parts of the charge air cooler 20 consist of brazed coated aluminum sheet. It is also preferred that the manifold 52 be formed from aluminum. However, the manifolds can also be made of other materials such as plastic. While particular forms for the plates 78 and 80 and manifolds 84 and 85 have been shown, they are only representative of one possible embodiment for purposes of illustrating a practical example. There are many possible variants that may prove advantages depending upon the particular application. Examples of possible variations are shown in German applications DE 100 45 987 filed Sep. 16, 2000 and DE 100 41 795 filed Aug. 25, 2000, which are also owned by the assignee of the present application of the present invention. The entire content of these applications are incorporated herein by reference. DE 100 45 987 is directed in particular towards connecting an outlet manifold 50 of a radiator 16, 18 with the inlet manifold of an adjacent heat exchanger 20. Applying this to the system 10 shown in FIG. 2, the manifold 50 of the radiator 18 has an outlet connection 94 that would be directly connected to the adjacent inlet connector 86 (shown in FIG. 5) of the charge air cooler 20 to feed cooled coolant from the radiator 18 into the charge air cooler 20 to cool the charge air flowing through the flow path 24.

Another embodiment of the cooling system 10 is shown in FIG. 6. In this embodiment, the charge air cooler 20 is smaller in comparison to the remainder of the cooling system 10 than the charge air cooler 20 shown in FIGS. 1–5. It can be seen that the broad side 51 of the charge air cooler in FIG. 6 does not cover the entire depth of the cooling system 10. Because of this, space is created which can accommodate an expansion vessel 100. Additionally, the embodiment of the cooling system shown in FIG. 6 includes a heat exchanger 102 located at the bottom of the box-like arrangement of heat exchangers, rather then the wall 32. In the illustrated embodiment, the heat exchanger 102 is a condenser, which, viewed in the direction of the radial air flow, is arranged in front of an additional radiator.

It should be appreciated that by providing a coolant cooled charge air cooler at one side of the box-like arrangement of the cooling system 10 with a surface 30 that blocks the outflow of the radial air flow from the system, thereby forcing the radial air flow through the cores of the remaining heat exchangers, the system 10 can achieve an improved overall system cooling performance in a package that is smaller, or at least no bigger, than a conventional box-like cooling system or a conventional cooling system that employs an axial air flow fan. By directing the radial air flow from the fan 12 through the other heat exchangers of the cooling system 10, rather then through the charge air cooler, the volume flow of air through each of the other heat exchangers can be improved which can increase cooling power of the other heat exchangers, including one or both of the radiators 16 and 18, despite that part of the cooling capacity of the coolant from the radiators 16, 18 is being used for cooling the charge air in the charge air cooler 20.

It should be understood that, while in a preferred embodiment the broad side 51 of the charge air cooler 20 defines the surface 30, in some applications it may be desirable to include an intermediate wall (not shown) or the like between the broad side 51 and the fan 12 so that the intermediate wall covers the broad side 51 and is blown against by the radial air flow. Such an intermediate wall need not necessarily be flat and can be designed in the form of a guide element for the radial air flow and therefore have any suitable shape.

Additionally, it should be appreciated the regulation of the charge air cooler based on demand (cooling of the charge air is not required in all operating phases) can be simpler and can be achieved more precisely then in a conventional air-cooled charge air cooler.

It should also be understood that the effectiveness of the cooling system may be improved by certain modifications. For example, it conceivable to bend the charge air cooler 20, at least by a limited amount, roughly in the center. This would provide greater space in the area over the downward bend, and the inward facing broad side 51 that follows the bend can guide the radial air flow towards the coolers 16, 18.

It may be also beneficial to use air guide sheets within the arrangement, which can be fastened on the rear wall 59 and/or on the front wall 36.

Another modification could consist of using additional, very flatly designed coolers in the front wall 36 of the system 10. The opening in the front wall 36 required for this can be provided with a cover on the interior side of the front wall 36, which can be kept closed during operation of the radial fan 12 by the pressure prevailing in the interior 22. Openings which can be closed in the same way can be arranged in addition to or just alone in the front wall 36, in order to raise the volume flow of cooling air in dynamic pressure operation of the system.

We claim:

1. A cooling system for a vehicle, the cooling system comprising:
    a radial fan rotatable about an axis to deliver a radial air flow to the cooling system;
    a plurality of heat exchangers spaced radially from the fan and arranged around the fan to receive the radial air flow therefrom, the heat exchangers bounding an interior space of the cooling system, one of the plurality of heat exchangers being a charge air cooler, the charge air cooler including a first flow path for a charge air flow in heat exchange relation with a second flow path for an engine coolant flow of the vehicle;
    a surface located relative to the fan and the charge air cooler to block the radial air flow from exiting the interior space through the charge air cooler; and
    wherein at least one of the plurality of heat exchangers is a radiator for the engine coolant and includes a coolant outlet connected to a coolant inlet of the charge air cooler to direct the engine coolant to the second flow path.

2. A cooling system for a vehicle, the cooling system comprising:
    a radial fan rotatable about an axis to deliver a radial air flow to the cooling system;
    a plurality of heat exchangers spaced radially from the fan and arranged around the fan to receive the radial air flow therefrom, the heat exchangers bounding an interior space of the cooling system, one of the plurality of heat exchangers being a charge air cooler, the charge air cooler including a first flow path for a charge air flow in heat exchange relation with a second flow path for an engine coolant flow of the vehicle;
    a surface located relative to the fan and the charge air cooler to block the radial air flow from exiting the interior space through the charge air cooler; and
    further comprising a wall and wherein the surface is defined at least in part by the wall located between the charge air cooler and the fan.

3. A cooling system for a vehicle, the cooling system comprising:
    a radial fan rotatable about an axis to deliver a radial air flow to the cooling system;
    a plurality of heat exchangers spaced radially from the fan and arranged around the fan to receive the radial air flow therefrom, the heat exchangers bounding an interior space of the cooling system, one of the plurality of heat exchangers being a charge air cooler, the charge air cooler including a first flow path for a charge air flow in heat exchange relation with a second flow path for an engine coolant flow of the vehicle;
    a surface located relative to the fan and the charge air cooler to block the radial air flow from exiting the interior space through the charge air cooler;

a front face to receive an axial air flow to the radial fan;
a rear wall located opposite the front face to close an opening bounded by the plurality of heat exchangers; and
an additional heat exchanger arranged in the rear wall.

4. A cooling system for a vehicle, the cooling system comprising:
  a radial fan rotatable about an axis to deliver a radial air flow to the cooling system;
  a plurality of heat exchangers spaced radially from the fan and arranged around the fan to receive the radial air flow therefrom, the heat exchangers bounding an interior space of the cooling system, one of the plurality of heat exchangers being a charge air cooler, the charge air cooler including a first flow path for a charge air flow in heat exchange relation with a second flow path for an engine coolant flow of the vehicle; and
  a surface positioned in the cooling system to redirect the radial air flow that would otherwise exit through the charge air cooler to exit through other heat exchangers of said plurality of heat exchangers wherein at least one of the plurality of heat exchangers is a radiator for the engine coolant and includes a coolant outlet connected to a coolant inlet of the charge air cooler to direct the engine coolant to the second flow path.

5. A cooling system for a vehicle, the cooling system comprising:
  a radial fan rotatable about an axis to deliver a radial air flow to the cooling system;
  a plurality of heat exchangers spaced radially from the fan and arranged around the fan to receive the radial air flow therefrom, the heat exchangers bounding an interior space of the cooling system, one of the plurality of heat exchangers being a charge air cooler, the charge air cooler including a first flow path for a charge air flow in heat exchange relation with a second flow path for an engine coolant flow of the vehicle; and
  a surface positioned in the cooling system to redirect the radial air flow that would otherwise exit through the charge air cooler to exit through other heat exchangers of said plurality of heat exchangers further comprising a wall and wherein the surface is defined at least in part by the wall located between the charge air cooler and the fan.

6. A cooling system for a vehicle, the cooling system comprising:
  a radial fan rotatable about an axis to deliver a radial air flow to the cooling system;
  a plurality of heat exchangers spaced radially from the fan and arranged around the fan to receive the radial air flow therefrom, the heat exchangers bounding an interior space of the cooling system, one of the plurality of heat exchangers being a charge air cooler, the charge air cooler including a first flow path for a charge air flow in heat exchange relation with a second flow path for an engine coolant flow of the vehicle;
  a surface positioned in the cooling system to redirect the radial air flow that would otherwise exit through the charge air cooler to exit through other heat exchangers of said plurality of heat exchangers;
  a front face to receive an axial air flow to the radial fan;
  a rear wall located opposite the front face to close an opening bounded by the plurality of heat exchangers; and
  an additional heat exchanger arranged in the rear wall.

* * * * *